US012617718B2

(12) United States Patent
He et al.

(10) Patent No.: US 12,617,718 B2
(45) Date of Patent: May 5, 2026

(54) ENERGY-EFFICIENT, CARBON-ENRICHED CEMENT PRODUCTION SYSTEM AND A METHOD OF PRODUCING CEMENT CLINKER

(71) Applicant: Tianjin Cement Industry Design & Research Institute Co., Ltd., Tianjin (CN)

(72) Inventors: Xiaolong He, Tianjin (CN); Xueping Peng, Tianjin (CN); Changhua Chen, Tianjin (CN); Zhongyuan Dai, Tianjin (CN)

(73) Assignee: Tianjin Cement Industry Design & Research Institute Co., Ltd., Tianjin (CN)

( * ) Notice: Subject to any disclaimer, the term of this patent is extended or adjusted under 35 U.S.C. 154(b) by 361 days.

(21) Appl. No.: 18/255,715

(22) PCT Filed: Dec. 16, 2020

(86) PCT No.: PCT/CN2020/136713
§ 371 (c)(1),
(2) Date: Jun. 2, 2023

(87) PCT Pub. No.: WO2022/126410
PCT Pub. Date: Jun. 23, 2022

(65) Prior Publication Data
US 2024/0034673 A1      Feb. 1, 2024

(51) Int. Cl.
*F27B 15/00*      (2006.01)
*C04B 7/36*      (2006.01)
(Continued)

(52) U.S. Cl.
CPC ................ *C04B 7/47* (2013.01); *C04B 7/364* (2013.01); *C04B 7/432* (2013.01); *C04B 7/4415* (2013.01)

(58) Field of Classification Search
CPC ........... C04B 7/47; C04B 7/364; C04B 7/432; C04B 7/4415; F27B 7/2033; F27B 7/205; F27B 15/006; F26B 25/007; F27D 15/02
See application file for complete search history.

(56) References Cited

U.S. PATENT DOCUMENTS

| | | | | |
|---|---|---|---|---|
| 4,183,762 A | * | 1/1980 | Deussner ............. | F27B 7/2033 106/761 |
| 6,383,283 B1 | * | 5/2002 | Doumet ................... | C04B 7/60 432/106 |
| 2011/0113987 A1 | | 5/2011 | Jorget et al. | |

FOREIGN PATENT DOCUMENTS

| | | | | |
|---|---|---|---|---|
| CA | 2299443 C | * | 6/2009 | ............. C04B 7/434 |
| CN | 202216538 U | | 5/2012 | |

(Continued)

OTHER PUBLICATIONS

English translation of the International Search Report from corresponding PCT Appln. No. PCT/CN2020/136713, dated Jun. 23, 2022.

(Continued)

*Primary Examiner* — Gregory A Wilson
(74) *Attorney, Agent, or Firm* — AP3 Law Firm PLLC

(57)      ABSTRACT

The present disclosure provides an energy-efficient (low energy consumption), carbon enriched cement production system and a method for producing cement clinker. This system involves raw material preheating and precalcining system and sequentially connected kiln inlet chamber, rotary kiln and cooler, wherein the raw material preheating and precalcining system involves precalciner and preheater, and the cooler involves first cooling zone and second cooling zone. The first cooling zone includes first cooling partition and second cooling partition, wherein a mixture of pure oxygen and high-concentration $CO_2$ flue gas entering the inlet of the first cooling partition, high-concentration $CO_2$ (Continued)

flue gas entering the inlet of the second cooling partition, and air entering the inlet of the second cooling zone have solved the problems in existing cement kiln $CO_2$ enrichment technology, i.e., extensive air leakage and high energy consumption between the first cooling zone and the second cooling zone.

15 Claims, 2 Drawing Sheets

(51) Int. Cl.
*C04B 7/43* (2006.01)
*C04B 7/44* (2006.01)
*C04B 7/47* (2006.01)

(56) References Cited

FOREIGN PATENT DOCUMENTS

| | | | |
|---|---|---|---|
| CN | 103253879 A | 8/2013 | |
| CN | 110746131 A | 2/2020 | |
| CN | 210855853 U | 6/2020 | |
| CN | 210862175 U | 6/2020 | |
| CN | 210922156 U | 7/2020 | |
| CN | 210980758 U | 7/2020 | |
| CN | 211035717 U | 7/2020 | |
| CN | 211695832 U | 10/2020 | |
| CN | 115867515 A * | 3/2023 | ............... C04B 7/43 |
| EP | 2759793 A1 * | 7/2014 | ............. C04B 7/434 |
| FR | 2527588 A1 * | 12/1983 | ............. C04B 7/361 |

OTHER PUBLICATIONS

Tetzner, M. letter to Grossman, Tucker, Perreault & Pfleger, PLLC, dated Sep. 18, 2025, 2 pages.
Tetzner, M. letter to Tianjin Cement Industry Design & Research Institute co.,Ltd., dated Sep. 18, 2025, 4 pages.
ECRA: European Cement Research Academy, ECRA, Ed. ECRA CCS Project: Report on Phase IV.A, Duesseldorf, (Technical Report TR-ECRA-128/2026), dated Aug. 2016, 44 pages.
Figure1-1., Configuration of a Full Oxyfuel Cement Plant, (said pdf corresponding to Figure 1-1 of the above-cited ECRA document), 1 page.
Gerhard, H. et al., VDZ Activity Report 2012-2015, dated Sep. 2015, 188 pages.

* cited by examiner

ENERGY-EFFICIENT, CARBON-ENRICHED CEMENT PRODUCTION SYSTEM AND A METHOD OF PRODUCING CEMENT CLINKER

CROSS-REFERENCE TO RELATED APPLICATIONS

This application is a national application of International Application No. PCT/CN2020/136713 filed on Dec. 16, 2020, the disclosure of which is hereby incorporated by reference in its entirety.

TECHNICAL FIELD

The present disclosure relates to the field of cement process technology, in particular to a carbon-enriched cement production system with low energy consumption and a method of producing cement clinker.

BACKGROUND

As global climate heats up, carbon dioxide emissions have received widespread attention. Oodles of carbon dioxide are produced during cement production. According to statistics, the production of 1-ton cement emits 0.6 to 0.7 ton carbon dioxides. Carbon dioxide in cement kiln exhaust gas mainly comes from two sources:

1. Carbon dioxide generated by fuel combustion, accounting for about 40%.
2. Carbon dioxide generated from the decomposition of carbonate in raw materials, accounting for about 60%.

The Cement Technology Roadmap 2050 developed by the International Energy Agency (IEA) in cooperation with the Cement Sustainability Initiative (CSI) states that carbon capturing and sequestering technology is currently the most viable new technology for reducing $CO_2$ emissions in the cement industry, and expected to cut down 56% $CO_2$ emissions by 2050.

At present, the technology of capturing all carbon dioxides in cement kiln waste gas is yet in the R&D stage when the enrichment of carbon dioxides in waste gas is the key point.

One $CO_2$ enrichment means used in current cement kilns is as follows: the original cooler is divided into first cooling zone and second cooling zone; the first cooling zone is injected with $O_2/CO_2$ mixture for heat exchange with clinker, and the heat-exchanged flue gas enters the rotary kiln and precalciner; the second cooling zone is injected with conventional air for heat exchange with clinker, and the heat-exchanged air is used for waste heat utilization or emission;

For one thing, the cement kiln is automatically enriched with $CO_2$, which greatly facilitates the subsequent operation of $CO_2$ capture and purification. And for another, the temperature of cooled cement clinker meets the follow-up production requirements, and the cooling effect of the cement clinker is not affected.

The above $CO_2$ enrichment technology for cement kiln has the following problems:

1. The $O_2/CO_2$ mixture in the first cooling zone and the air in the second cooling zone can easily be blended to reduce the concentration of $CO_2$ in the flue gas, affecting subsequent $CO_2$ capture while increasing the consumption of pure oxygen. All this will increase the production cost.

2. The heat recovery of high temperature air out of the cooler is not sufficient. After oxyfuel combustion, the combustion air volume required for rotary kiln and decomposer is lowered, making it difficult to fully recover the heat of high temperature air exiting the first cooling zone to the calcining system, thus causing high energy consumption during cement production.

SUMMARY

To overcome the defects of the prior art, the present disclosure provides an energy-efficient, carbon-enriched cement production system and a method of producing cement clinker that can solve the problems in existing cement kiln's $CO_2$ enrichment technology, namely the $O_2/CO_2$ mixture in the first cooling zone and the air in the second cooling zone are prone to blending, consequently lowering the $CO_2$ concentration in the flue gas and therefore affecting subsequent $CO_2$ capture. This will increase the consumption of pure oxygen and cause an increase in the production cost as well as inadequate heat recovery of high temperature air out of the cooler and high energy consumption in cement production.

The present disclosure is realized by the following technical solutions:

An energy-efficient, carbon-enriched cement production system of the present disclosure, comprising raw meal preheating and precalcining system, kiln inlet chamber, rotary kiln and cooler, wherein the rotary kiln is provided with first burner;

The kiln inlet chamber, rotary kiln and cooler are connected in sequence;

The raw material preheating and precalcining system includes precalciner and preheater, wherein the precalciner is equipped with second burner and raw material inlet;

The bottom air inlet of the preheater is connected to the outlet duct of the precalciner, and the top air outlet of the preheater emits low temperature flue gas; the top feed port of the preheater is used for feeding raw materials, and the bottom discharge port thereof is connected to the kiln inlet chamber;

The cooler includes the first and second cooling zones. The first cooling zone comprises the first and second cooling partitions, and the second cooling partition is arranged between the first cooling partition and the second cooling zone. The inlet of the first cooling partition is used to feed a mixture of pure oxygen and high-concentration $CO_2$ flue gas, the inlet of the second cooling partition to fill high-concentration $CO_2$ flue gas, and the inlet of the second cooling zone to fill air.

Furthermore, the cooler is a grate cooler provided with a roll mill in the middle, dividing it into first cooling zone and second cooling zone.

Furthermore, the first cooling zone is provided with a partition wall in the middle, dividing it into first cooling partition and second cooling partition.

Furthermore, the outlet of the second cooling partition is connected to the air inlet of the preheater through the first pipe.

Furthermore, the outlet gas of the first cooling zone is split in two: one as secondary air directly enters the rotary kiln for fuel combustion, and the other as tertiary air enters the precalciner for fuel combustion through the tertiary air duct.

Furthermore, the air outlet of the preheater is connected via the second pipe to the first fan, the flue gas from the air outlet of which is split in two: one enters the carbon capture system through the third pipe, and the other enters the fourth pipe where the second fan is set. The flue gas from the outlet of the fourth pipe as circulating flue gas mixes with pure oxygen before entering the inlet of the first cooling partition.

Furthermore, the air outlet of the preheater is connected to the first fan through the second pipe, and the flue gas from the air outlet of the first fan is split in two: one enters the carbon capture system via the third pipe, and the other enters the fourth pipe where the second fan is set. The flue gas enters the inlet of the second cooling partition as circulating flue gas after exiting the outlet of the fourth pipe.

Furthermore, the air outlet of the preheater is connected via the second pipe to the first fan, from the air outlet of which the flue gas is split in two: one enters the carbon capture system through the third pipe, and the other enters the fourth pipe where the second fan is set. The flue gas is divided into two circulating portions by the outlet of the fourth pipe: one enters the fifth pipe to mix with the pure oxygen and get into the first cooling partition via its inlet, while the other enters the inlet of the second cooling partition via the sixth pipe.

Furthermore, the second pipe is equipped with a heat exchanger.

Furthermore, the fourth pipe is arranged with a dust collector at a position close to the air inlet of the second fan.

Furthermore, the fourth pipe is equipped with a first valve.

Furthermore, the fifth pipe is equipped with a second valve.

A method of producing cement clinker using the cement production system, including the following steps:

I-1 feeding raw materials into the preheater where they are separated from the flue gas by heat exchange to obtain preheated raw materials;

I-2 the preheated raw materials entering the precalciner in which the burning fuel releases a large amount of heat to break down the raw materials, forming hot raw materials;

I-3 the hot raw materials passing from the kiln inlet chamber into the rotary kiln where they are calcined into cement clinker, which enters the cooler from the rotary kiln outlet. Specific operations are as follows:

Initially cooling the cement clinker with the mixture of pure oxygen and high-concentration $CO_2$ flue gas poured into the first cooling partition to obtain the first cooled gas and the first cooled cement clinker;

Dropping the first cooled cement clinker into the second cooling partition and cooling it again with high-concentration carbon dioxide gas (secondary cooling) to obtain the second cooled gas and the second cooled cement clinker;

Allowing the second cooled cement clinker to enter the second cooling zone and cooling it again with the air in the second cooling zone (tertiary cooling) to obtain the finished cement clinker as well as the third cooled gas;

I-4 the kiln gas entering the precalciner meets the flue gas produced by fuel combustion and raw material decomposition in the precalciner to form a mixed flue gas product, which enters the preheater via the outlet duct of the precalciner and is separated from the raw material in the preheater by heat exchange to become low-temperature flue gas to be discharged from the top air outlet of the preheater. The $CO_2$ concentration in the low-temperature flue gas is 70-95%;

Furthermore, it includes step I-5, comprising the following three scenarios:

The exhausted low-temperature flue gas enters the first fan. The flue gas from the air outlet of the first fan is divided into two ways: one enters the carbon capture system and the other becomes circulating flue gas after passing the second fan and along with pure oxygen enters the inlet of the first cooling partition;

The exhausted low-temperature flue gas enters the first fan, the flue gas from the air outlet of the first fan is divided into two ways: one enters the carbon capture system and the other passes the second fan and enters the inlet of the second cooling partition as circulating flue gas;

The exhausted low-temperature flue gas enters the first fan. The flue gas from the air outlet of the first fan is divided into two ways, one entering the carbon capture system and the other being further split in two when passing the second fan: one meets pure oxygen to become a mixed gas entering the inlet of the first cooling partition, while the other namely circulating flue gas enters the inlet of the second cooling partition.

Furthermore, the first cooled gas is divided into two portions. The first portion enters the rotary kiln as secondary air for fuel combustion, and the kiln gas formed by fuel combustion and decomposition of partial raw materials in the rotary kiln enters the precalciner; the second portion enters the precalciner as tertiary air for fuel combustion.

Furthermore, the second cooled gas enters the air inlet of the preheater.

Furthermore, the discharged low-temperature flue gas enters the heat exchanger for heat exchange and utilization before entering the first fan.

Furthermore, the second portion of flue gas enters the dust collector for dust removal before entering the second fan.

Compared with the closest prior art, the technical solution of the present disclosure has the following beneficial effects:

The present disclosure provides an energy-efficient, carbon-enriched cement production system, wherein the cooler includes a first cooling zone consisting of first cooling partition and second cooling partition and a second cooling zone. A mixture of pure oxygen and high-concentration $CO_2$ flue gas pours into the first cooling partition through its inlet, high-concentration $CO_2$ flue gas into the second one through its inlet, and air into the second cooling zone through its inlet. The second cooling partition filled with high-concentration $CO_2$ flue gas is used to prevent the air from flowing back and forth between the first cooling partition and the second cooling zone, avoid reducing the $CO_2$ concentration in the first cooling partition, and improve the carbon enrichment effect of the cement production system.

In the energy-efficient, carbon-enriched cement production system provided by the present disclosure, the outlet of the second cooling partition is connected to the air inlet of the preheater through the first pipe so that the heat of the high-concentration carbon dioxide flue gas after cooling the cement clinker can be used for raw materials to exchange heat in the preheater and lessen the thermal energy consumption of the cement production system.

BRIEF DESCRIPTION OF THE DRAWINGS

To more clearly illustrate the embodiments of the present disclosure or the technical solutions in the prior art, the following drawings required for the description of the embodiments or prior art have been briefly described. Apparently, the drawings in the following description are merely some embodiments of the present disclosure, and those having ordinary skills in the art can obtain other drawings according to these drawings without creative efforts.

Figure 1:
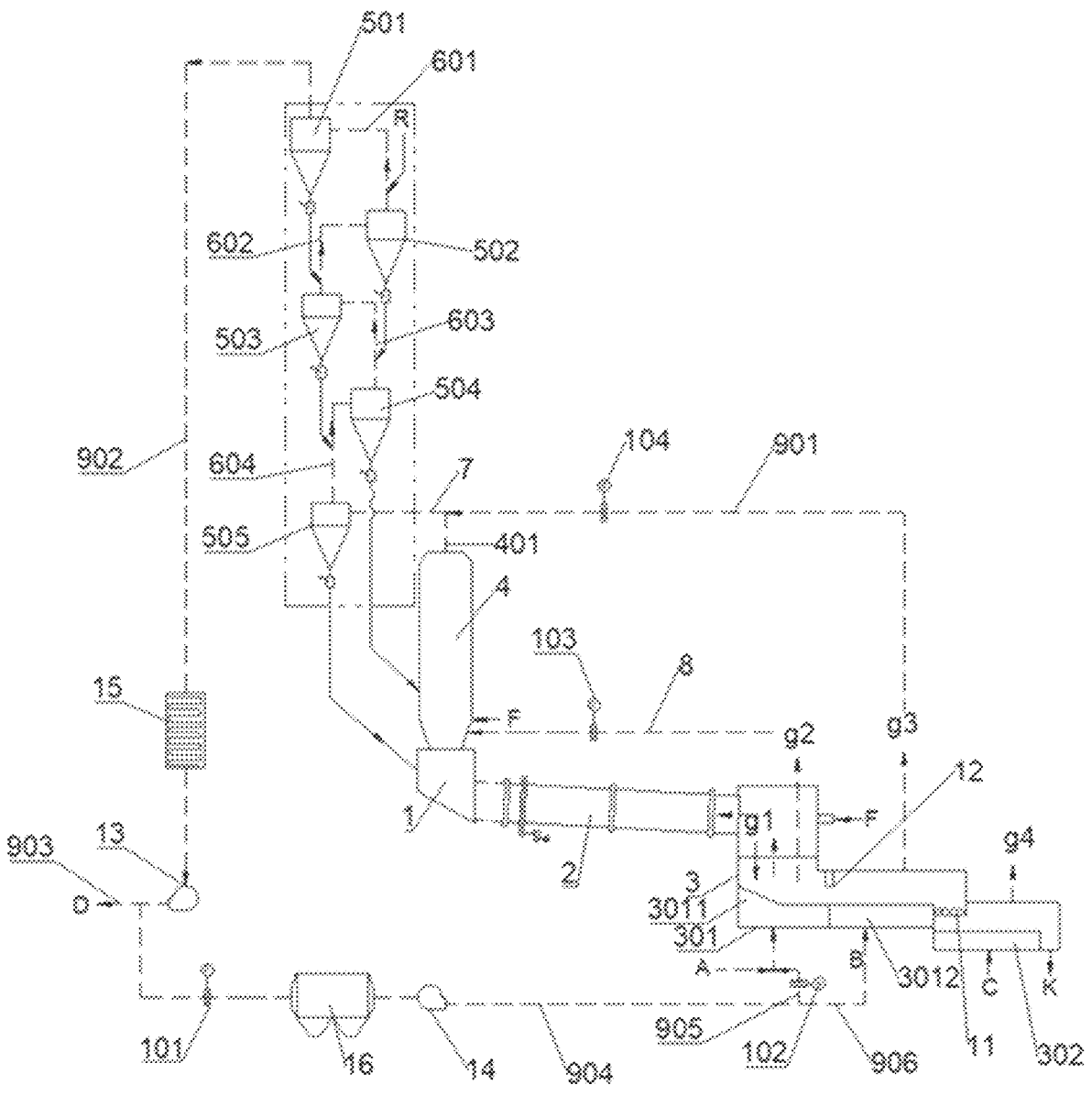
FIG. 1 is a schematic diagram for the structure of the energy-efficient, carbon-enriched cement production system of the present disclosure.

Wherein, 1—kiln inlet chamber, 2—rotary kiln, 3—cooler, 301—first cooling zone, 3011—first cooling partition, 3012—second cooling partition, 302—second cooling zone, 4—precalciner, 401—outlet duct, 5—preheater, 501—first cyclone separator, 502—second cyclone separator, 503—third cyclone separator, 504—fourth cyclone separator, 505—fifth cyclone separator, 601—first inlet duct, 602—second inlet duct, 603—third inlet duct, 604—fourth inlet duct, 7—connecting pipe, 8—tertiary air duct, 901—first pipe, 902—second pipe, 903—third pipe, 904—fourth pipe, 905—fifth pipe, 906—sixth pipe, 101—first valve, 102—second valve, 103—third valve, 104—fourth valve, 11—roll mill, 12—partition wall, 13—first fan, 14—second fan, 15—heat exchanger, 16—dust collector.

DETAILED DESCRIPTION OF THE EMBODIMENTS

The technical solutions of the present disclosure will be clearly and completely described below in conjunction with the embodiments thereof. Apparently, the described embodiments are a partial set, not all the embodiments of the application. Based on the embodiments in the present disclosure, all other embodiments obtained by those having ordinary skills in the art without making creative efforts fall within the protection scope of the present disclosure.

In the description of the present disclosure, it should be understood that the orientational or positional relationship denoted by the terms "center" (or "central"), "longitudinal", "transverse", "above", "below" or "under", "front", "back" (or "rear" or "behind"), "left", "right", "vertical", "horizontal", "top", "bottom", "inside" or "inner" or "internal", "outside" or "outer" or "external", etc. are based on the orientational or positional relationship shown in the drawings, and are intended only to facilitate and simplify the description of the disclosure, not to indicate or imply that the device or element referred to must have a particular orientation and be constructed and operated in a particular orientation, and therefore cannot be construed as limiting the disclosure. In addition, the terms "first" and "second" are only used for descriptive purposes, which are not supposed to be construed as indicating or implying the relative importance or implicitly specifying the number of technical features indicated. Thus, a feature qualified with "first", "second", etc. may explicitly or implicitly include one or more such features. In the description of the disclosure, "multiple" or "several" means two or more unless otherwise stated.

In the description of the disclosure, what needs to be explained is that, unless otherwise expressly specified and limited, the terms "installed" ("mounted", "equipped", "provided", "arranged", "furnished", or "set"), "connected" and "linked" (or "joined") are to be understood in a broad sense. For instance, they can either be translated as immovable connection, removable/detachable connection, integral connection/one piece, or mechanical connection or electrical connection, or direct connection, or indirect connection through an intermediate medium, or internal connection of two elements. For those skilled in the art, the specific meaning of the aforesaid terms in the context of the present disclosure can be understood according to the conditions.

The present disclosure will be explained in detail by referring to the drawings below and with the embodiments.

FIG. 1 gives a schematic diagram for the structure of the energy-efficient, carbon-enriched cement production system of the embodiment, in which the dashed lines with arrows indicate the air flow direction and the solid lines with arrows represent the material flow direction. This energy-efficient, carbon-enriched cement production system includes kiln inlet chamber 1, rotary kiln 2, cooler 3 and raw material preheating and precalcining system.

The raw material preheating and precalcining system is connected to kiln inlet chamber 1; rotary kiln 2 is equipped with a first burner to which fuel F is injected. The tail of rotary kiln 2 is connected to kiln inlet chamber 1, and the head of rotary kiln 2 is connected to cooler 1.

The raw material preheating and precalcining system includes precalciner 4 and preheater 5, preferably a cyclone preheater. The preheater 5 shown in the figure is a cyclone preheater, and only 1-column of cyclone preheaters are used. What needs explanation is that the column number of the cyclone preheater in the figure is for illustrative purposes only, which can be determined by those of ordinary skills in the art according to actual needs.

A second burner is set on precalciner 4 and filled with fuel F. The side wall of precalciner 4 is opened with a raw material inlet, and the top thereof is provided with the air outlet duct 401. It should be noted that 401 can also be arranged on the side of the precalciner 4.

The bottom air inlet of the preheater 5 is connected to the outlet duct 401 of the precalciner 4, and the top air outlet of the preheater 5 discharges low-temperature flue gas; the top feed port of the preheater 5 is used for feeding raw material R feeding, and the bottom discharge port of the preheater 5 is connected to the kiln inlet chamber 1. Specifically, the cyclone preheater shown in the figure includes the first cyclone separator 501, the second cyclone separator 502, the third cyclone separator 503, the fourth cyclone separator 504 and the fifth cyclone separator 505 connected in sequence. What needs explanation is that the number of cyclone separators in the figure is for illustrative purposes only, which can be determined by those having ordinary skills in the art when needed.

On the top of the first cyclone separator 501 is an air outlet, where low-temperature flue gas comes out. The top side of the first cyclone separator 501 is connected to the first inlet duct 601; the first inlet duct 501 is provided with a feed port to load raw materials, and the bottom of the first cyclone separator 501 is connected to the second inlet duct 602.

The top of the second cyclone 502 is connected to the first inlet duct 601, the top side thereof to the second inlet duct 602, and the bottom thereof to the third inlet duct 603.

The top of the third cyclone separator 503 is connected to the second inlet duct 602, the top side thereof to the third inlet duct 603, and the bottom thereof to the fourth inlet duct 604.

The top of the fourth cyclone 504 is connected to the third inlet duct 603, the top side thereof to the fourth inlet duct 604, and the bottom thereof to the raw material inlet of the precalciner 4.

The top of the fifth cyclone separator 505 is connected to the fourth inlet duct 604, the top side thereof provided with an air inlet, which is connected with the outlet duct 401 of the precalciner 4 via the connecting pipe 7. The bottom of the fifth cyclone separator 505 is furnished with a discharge port connected to the kiln inlet chamber 1.

Cooler 3 is a grate cooler, in the middle of which is roll mill 11 that divides the cooler 3 into first cooling zone 301 and second cooling zone 302. In the middle of the first cooling zone 301 is a partition wall 12, dividing it into first cooling partition 3011 and second cooling partition 3012, with the latter being set between the first cooling partition 3011 and the second cooling zone 302.

The inlet of the first cooling partition 3011 is fed with a mixture of pure oxygen A and high-concentration $CO_2$ (70-95%) flue gas, and the oxygen concentration in the mixture is 30-70%. The inlet of the second cooling partition 3012 is fed with high-concentration $CO_2$ (70-95%) flue gas B, and the inlet of the second cooling zone 302 is fed with air C. The output source of air can be a fan, and pure oxygen can be produced by an oxygen-making system or purchased; the preferred purity range of pure oxygen is 85-98%.

Partitioning the cooler 3 in the way mentioned above can block air flow between the first cooling partition 3011 and the second cooling partition 3012 to avoid reducing the carbon dioxide concentration in the first cooling partition 3011 and improve the carbon enrichment effect of the cement production system.

As an exemplary embodiment, the first cooled gas is discharged from the outlet of the first cooling partition 3011 and divided into two paths: the first cooled gas g1 of the first path directly enters the rotary kiln 2 as secondary air for fuel combustion, and the first cooled gas g2 of the second path enters the precalciner 4 as tertiary air for fuel combustion through the tertiary air duct 8.

From the outlet of the second cooling partition 3012 discharges the second cooled gas g3, which is connected to the air inlet of the preheater 5 via the first pipe 901, i.e., to the air inlet of the fifth cyclone separator 505, so that the high temperature heat of the high-concentration $CO_2$ flue gas after cooling the cement clinker is used for heat exchange of the raw materials in the preheater, thus lowering the thermal energy consumption of the cement production system.

From the outlet of the second cooling zone 302 discharges the third cooled gas g4, which has a temperature of 200-300° C. and is used for drying the heat sources of the raw material and fuel grinding system to further use the heat source generated by the cement production system. At the same time, cement clinker is cooled by the second cooling zone 302 to obtain the finished cement clinker K.

As an exemplary embodiment, to achieve full utilization of the flue gas from the outlet of the preheater outlet, the outlet of the preheater 5 is connected to the first fan 13 through the second pipe 902, i.e., the air outlet of the first cyclone separator 501 in the figure is connected to the first fan 13 through the second pipe 902. The flue gas from the outlet of the first fan 13 is divided into two: the first flue gas D enters the carbon capture system via the third pipe 903, while the second flue gas enters the fourth pipe 904 provided with the second fan 14. The gas from the outlet of the fourth pipe 904 (70-95% $CO_2$ content in the flue gas) is treated in three ways:

Option 1: the flue gas exiting the fourth pipe 904 is mixed with pure oxygen as circulating flue gas to become the above-mentioned mixture to enter the inlet of the first cooling partition 3011.

Option 2: the flue gas exiting the fourth pipe 904 enters the inlet of the second cooling partition 3012 as circulating flue gas.

Option 3: the flue gas exiting the fourth pipe 904 as circulating flue gas is split in two. The first circulating flue gas enters the fifth pipe 905 to mix with pure oxygen and enter the inlet of the first cooling partition 3011, and the second circulating flue gas enters the inlet of the second cooling partition 3012 through the sixth pipe 906.

The first fan 13 is a high temperature fan and the second fan 14 is a circulating fan. Since the flue gas discharged from the preheater air outlet is used as a cooling medium to enter the cooler 3, to avoid the flue gas temperature from getting too high to cool the clinker in the cooler 3, the exemplary embodiment is that a heat exchanger 15 is provided on the second pipe 902 so that the flue gas temperature at the outlet of the heat exchanger 15 is reduced to below 60-100° C. Preferably, the heat exchanger 15 can either be a waste heat power generating boiler or an air-to-air heat exchanger.

The flue gas entering the second fan 14 may have a high dust content. If the dust content is high, the dust will easily settle in the fourth pipe 904 between the second fan 14 and the cooler 1 to form a buildup and increase the pipe resistance, and on the other hand, the high dust content will increase the wear of the second fan 14. Therefore, as an exemplary embodiment, the fourth pipe 904 is provided with a dust collector 16 at a position close to the air inlet of the second fan 14 as described above, to remove dust from the flue gas that is about to enter the second fan 14 in advance so that the dust concentration in the second fan 14 is reduced to less than 100 mg/m³.

As an exemplary embodiment, a first valve 101 is set on the fourth pipe 904 for ease of adjusting the flue gas circulation volume, thereby enabling the temperature of the gas exiting from the cooler 3 to be controlled at 500-900° C.;

Second valve 102 is set on the fifth pipe 905 so that the concentration of oxygen in the mixture of pure oxygen and carbon dioxide can be easily adjusted;

Third valve 103 is set on the third air pipe 8, facilitating the adjustment of tertiary air volume;

Fourth valve 104 is set on the first pipe 901, making the adjustment of the amount of the second cooled gas entering the preheater easier.

Figure 2:
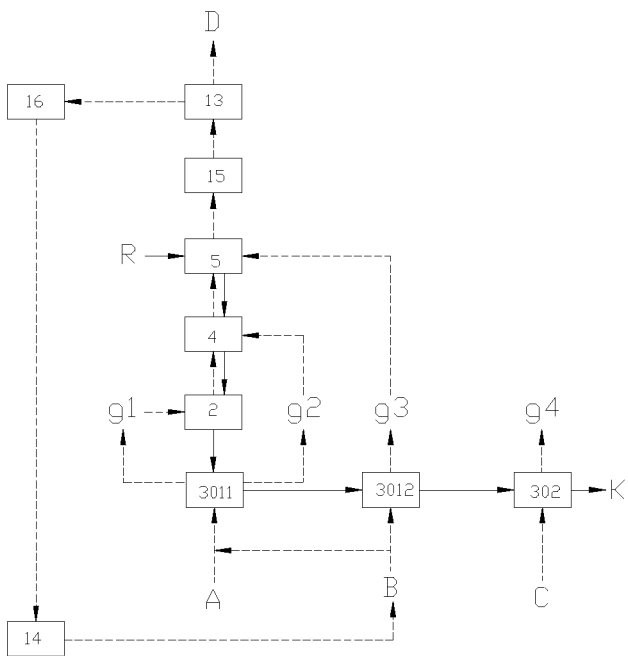
FIG. 2 is a flow chart of the method for producing cement using the energy-efficient, carbon-enriched cement production system.

FIG. 2 gives a flow chart of a method for producing cement with an energy-efficient, carbon-enriched cement production system, in which the dashed lines with arrows mean the direction of air flow and the solid lines with arrows the direction of material flow. The method of preparing cement clinker using the above cement production system includes the following steps:

I-1 feeding raw materials R into the preheater 5 where they are separated from the flue gas by heat exchange to obtain preheated raw materials;

I-2 the preheated raw materials entering the precalciner 4 in which the burning fuel releases a large amount of heat to break down the raw materials to form hot raw materials;

I-3 the hot raw materials passing from the kiln inlet chamber into the rotary kiln 2 where they are calcined into cement clinker, which enters the cooler 3 from the rotary kiln outlet. Specific operations are as follows:

Initially cooling the cement clinker with the mixture of pure oxygen A and high-concentration $CO_2$ flue gas B poured into the first cooling partition 3011 to obtain the first cooled gas and the first cooled cement clinker;

The first cooled gas is divided into two portions. The first portion of the first cooled gas g1 enters the rotary kiln as secondary air for fuel combustion, and the kiln gas formed by fuel combustion and decomposition of partial raw materials in the rotary kiln enters the precalciner; the second portion of the first cooled gas g2 enters the precalciner as tertiary air for fuel combustion;

Dropping the first cooled cement clinker into the second cooling partition 3012 and cooling it again with high-concentration carbon dioxide gas (secondary cooling) to obtain the second cooled gas and the second cooled cement clinker;

The second cooled gas g3 enters the air inlet of the preheater 5; Allowing the second cooled cement clinker to enter the second cooling zone 302 and cooling it with the air C in the second cooling zone (tertiary cooling) to obtain the finished cement clinker K as well as the third cooled gas g4;

The third cooled gas g4 is used as the heat source of drying the raw material and fuel grinding system;

I-4 the kiln gas entering the precalciner 4 meets the flue gas produced by fuel combustion and raw material decomposition in the furnace to form a mixed flue gas product, which enters the preheater via outlet duct of the precalciner 4 and is separated from the raw material in the preheater 5 by heat exchange to become low-temperature flue gas to be discharged from the top air outlet of the preheater 5. The $CO_2$ concentration in the low-temperature flue gas is 70-95%;

I-5 the discharged low-temperature flue gas (containing 70-95% $CO_2$) enters the first fan 13 after heat exchange in the heat exchanger 15, and the flue gas from the air outlet of the first fan 13 is divided into two paths. The first-path flue gas D enters the carbon capture system, and the second-path flue gas is treated by the following three solutions:

1. The second-path flue gas enters the dust collector 16 for dust removal, and after passing the second fan 14 becomes circulating flue gas to form a mixture with the pure oxygen to enter the inlet of the first cooling partition 3011;

2. The second-path flue gas enters the dust collector 16 for dust removal, and after passing the second fan 14 becomes circulating flue gas to enter the inlet of the second cooling partition 3012;

3. The second-path flue gas enters the dust collector 16 for dust removal, and after passing the second fan 14 becomes circulating flue gas, which is further divided into two portions: the first portion forms a mixture with pure oxygen to enter the inlet of the first cooling partition 3011, and the second one enters the inlet of the second cooling partition 3012 (FIG. 2 illustrates the flow of this solution).

The above embodiments are only intended to illustrate the technical solution of the present disclosure, not to limit it. Despite the detailed description of the disclosure with reference to the above embodiment, those of ordinary skills in the art can still make modification or equivalent substitution to the particular embodiment of the disclosure, and any such modification or substitution that does not depart from the spirit and scope of the application is within the protection scope of the claims in the present disclosure pending approval.

The invention claimed is:

1. An energy-efficient, carbon-enriched cement production system comprising:
   a raw meal preheating and precalcining system,
   a kiln inlet chamber,
   a rotary kiln comprising a first burner;
   a cooler;
   the kiln inlet chamber, the rotary kiln and the cooler being connected in sequence;
   the raw material preheating and precalcining system including a precalciner and a preheater, wherein the precalciner is equipped with a second burner and a raw material inlet;

a lowermost air inlet of the preheater being connected to an outlet duct of the precalciner, and an uppermost air outlet of the preheater being configured to emit a low temperature flue gas; an uppermost feed port of the preheater being configured for feeding raw materials, and a lowermost discharge port thereof being connected to the kiln inlet chamber;
   the cooler including a first cooling zone and a second cooling zone, wherein the first cooling zone is set with a partition wall in the middle, dividing it into a first cooling partition and a second cooling partition, and the second cooling partition being arranged between the first cooling partition and the second cooling zone, an inlet of the first cooling partition being configured to feed a mixture of pure oxygen and high-concentration $CO_2$ flue gas, an inlet of the second cooling partition being configured to fill high-concentration $CO_2$ flue gas, and an inlet of the second cooling zone being configured to fill air,
   an outlet of the second cooling partition being connected to the lowermost air inlet of the preheater through a first pipe,
   the uppermost air outlet of the preheater being connected via a second pipe to a first fan, from an air outlet of the first fan the low temperature flue gas being split into a first portion and a second portion: the first portion entering a carbon capture system through a third pipe, and the second portion entering a fourth pipe where a second fan is set, the low temperature flue gas being divided into a third portion and a fourth portion by an outlet of the fourth pipe: the third portion entering a fifth pipe to mix with pure oxygen and get into the first cooling partition via the inlet of the first cooling partition, while the fourth portion entering the inlet of the second cooling partition via a sixth pipe, and
   wherein the circulating flue gas has a $CO_2$ concentration of 70-95%.

2. An energy-efficient, carbon-enriched cement production system according to claim 1, characterized in that the cooler is a grate cooler provided with a roll mill in the middle, dividing it into the first cooling zone and the second cooling zone.

3. An energy-efficient, carbon-enriched cement production system according to claim 1, characterized in that the mixture of pure oxygen and high-concentration $CO_2$ flue gas of the first cooling partition is divided into a first portion and a second portion: wherein the first portion directly enters the rotary kiln as secondary air for fuel combustion, and the second portion enters the precalciner via a tertiary air duct as tertiary air for fuel combustion.

4. An energy-efficient, carbon-enriched cement production system according to claim 1, characterized in that the second pipe is furnished with a heat exchanger.

5. An energy-efficient, carbon-enriched cement production system according to claim 1, characterized in that the fourth pipe is arranged with a dust collector at a position close to an air inlet of the second fan.

6. An energy-efficient, carbon-enriched cement production system according to claim 1, characterized in that the fourth pipe is equipped with a first valve.

7. An energy-efficient, carbon-enriched cement production system according to claim 1, characterized in that the fifth pipe is equipped with a second valve.

8. A method of producing carbon enriched cement comprising:

feeding raw materials into a preheater where the raw materials are separated from a flue gas by heat exchange to obtain preheated raw materials;

providing the preheated raw materials to a precalciner in which a burning fuel releases a large amount of heat to break down the preheated raw materials, forming hot raw materials;

providing the hot raw materials passing from a kiln inlet chamber into a rotary kiln where they are calcined into a cement clinker, which enters a cooler from a rotary kiln outlet;

initially cooling the cement clinker with a mixture of pure oxygen and high-concentration $CO_2$ flue gas poured into a first cooling partition to obtain a first cooled gas and a first cooled cement clinker;

dropping the first cooled cement clinker into a second cooling partition and cooling it with a high-concentration carbon dioxide gas to obtain a second cooled gas and a second cooled cement clinker;

allowing the second cooled cement clinker to enter a second cooling zone and cooling it with air in the second cooling zone to obtain a finished cement clinker as well as a third cooled gas;

wherein a kiln gas entering the precalciner meets a flue gas produced by fuel combustion and raw material decomposition to form a mixed flue gas product, which enters the preheater via an outlet duct of the precalciner and is separated from the raw materials in the preheater by heat exchange to become a low-temperature flue gas to be discharged from the a top air outlet of the preheater, the $CO_2$ concentration in the low-temperature flue gas being 70-95%.

9. A method of producing carbon enriched cement according to claim 8 further comprising:

providing the low-temperature flue gas to a first fan, the low-temperature flue gas from an air outlet of the first fan being divided into a first portion and a second portion, the first portion entering a carbon capture system and the second portion becoming a circulating flue gas after passing a second fan and entering an enters an inlet of the first cooling partition after mixing with pure oxygen.

10. A method of producing carbon enriched cement according to claim 9, characterized in that the flue gas enters a heat exchanger for heat exchange and utilization before entering the first fan.

11. A method of producing carbon enriched cement according to claim 9, characterized in that the second portion of flue gas enters a dust collector for dust removal before entering the second fan.

12. A method of producing carbon enriched cement according to claim 8, characterized in that the first cooled gas is divided into a first portion and a second portion, the first portion entering the rotary kiln as secondary air for fuel combustion, and the kiln gas entering the precalciner; the second portion entering the precalciner as a tertiary air for fuel combustion.

13. A method of producing carbon enriched cement according to claim 8, characterized in that the second cooled gas enters an air inlet of the preheater.

14. A method of producing carbon enriched cement according to claim 8 further comprising:

providing the low-temperature flue gas enters to a first fan, from an air outlet of which the low-temperature flue gas is divided into a first portion and a second portion: the first portion entering a carbon capture system and the second portion passing a second fan and entering an inlet of the second cooling partition.

15. A method of producing carbon enriched cement according to claim 8 further comprising, providing the low-temperature flue gas to a first fan, the flue gas from an air outlet of the first fan being divided into a first portion and a second portion, the first portion entering a carbon capture system and the second portion being further split into a third portion and a fourth portion when passing a second fan: the third portion meeting pure oxygen to become a mixed gas entering an inlet of the first cooling partition, while the second portion enters an inlet of the second cooling partition.

* * * * *